Patented Jan. 28, 1941

2,230,084

UNITED STATES PATENT OFFICE 2,230,084

ASTRINGENT PREPARATION

Jules B. Montenier, Chicago, Ill.

No Drawing. Original application December 18, 1939, Serial No. 309,830. Divided and this application May 16, 1940, Serial No. 335,463

11 Claims. (Cl. 167—90)

My invention is concerned with improvements in cosmetic astringent preparations or, in other words, perspiration inhibiting or retarding compositions.

Astringent or perspiration-inhibiting compositions for cosmetic purposes have been known for a considerable period of time. Among the chemical compounds whose use for such purposes is known, or which have been suggested, as effective to prevent even the temporary exudation of perspiration from the sweat glands, are, for example, tartaric acid, benzoic acid, various salts of such acids, chromic acid, boric acid, various salts of salicylic acid, certain zinc salts, such as zinc chloride, alums, ferric chloride, thorium nitrate, and salts of aluminum such as the acetate, nitrate, chloride, lactate, sulphate, sulpho-carbolate, and aceto-tartrate. Because of certain shortcomings or deficiencies of various of these astringent materials, as for example, the relative toxicity of chromic acid and the irritating effects of zinc salts, the relatively low efficiency of tartaric acid, boric acid, benzoic acid, the salts of salicylic acid, and the tendency of ferric chloride to stain and its mordanting effect upon fabrics worn on the body close to the point of application of the astringent, said astringents have not met with commercial success. Some of them also possess other practical deficiencies which have also militated against their more widespread use.

Of all of the known cosmetic astringents, aluminum chloride has been most universally employed. Being a salt of a polyvalent metal, namely, trivalent aluminum, its efficiency as an astringent, which appears to be in direct ratio to the atomic weight of the acid or acid radical and the ionic strength thereof, is very high. Moreover, aluminum chloride also exerts its astringent properties over a relatively long period of time. In this connection, aluminum chloride produces a substantially immediate closing of the pores encasing the sweat glands and it serves to maintain them in that condition for a longer period of time than do other aluminum, or for that matter other ferric, salts which also possess astringent properties.

While aluminum chloride has the advantages outlined and, further, does not cause discoloration such as is produced by ferric chloride, it has the very serious drawback or disadvantage, shared also by others of the astringent materials, of being excessively acid in reaction. In order to prevent the hydrolysis of the aluminum chloride to insoluble and inefficient aluminum hydrate, it is necessary to maintain it in an excess acid concentration. This excessive acidity is very objectionable for cosmetic purposes for various reasons. Thus, it causes, in various cases, skin irritations which may and frequently do manifest themselves by a noticeable reddening of the skin. This condition is not infrequently aggravated, causing itching which, in turn, may develop into an eruption of pimples or even infection, particularly under the armpits. Again, the excess acidity of the aluminum chloride preparations brings about a destruction of clothing fabrics, particularly those made of cotton, and, further, discolors, if not actually bleaches, a goodly number of dyed materials. Hence, while aluminum chloride possesses many desirable properties as an astringent material, it also, unfortunately, has certain serious drawbacks which have tended to militate against its use.

I have made the discovery that by the addition of certain classes of chemical compounds, hereinafter set forth in detail, astringent materials and preparations are remarkably improved with respect to overcoming the defects of excessive acidity. While the principle of my invention is applicable to astringent materials generally which possess defects or disadvantages such as those pointed out hereinabove in connection with the use of aluminum chloride, it has particular and unusual applicability to preparations where aluminum sulphate or aluminum chloride, especially the latter, is employed as the astringent material.

I have discovered that by adding to an astringent material certain imide or nitrile compounds or other specific nitrogenous compounds hereinafter set forth, which compounds have only feebly ionizing properties or a very low factor of ionization, the disadvantages of excessive acidity are eliminated or at least substantially decreased without noticeable or appreciable detraction from the efficiency of the astringent material. Such addition agents should, of course, be compatible with the astringent material when the latter is utlized in liquid or lotion form, in stick form, or in the form of a cream or emulsion, as the case may be. The addition agents may possibly react with the excess hydrochloric acid, in case, for example, aluminum chloride is the astringent material utilized, to form addition compounds. At least they possess the property of counteracting the effect of the hydrochloric acid or the like which may be liberated by the aluminum chloride or similar astringent material. Whatever the exact mechanism of the reaction may be, I have demonstrated that, in accordance with the teachings of my invention herein, astringent preparations are remarkably improved without deleterious effect on their efficiency.

The imides and nitriles and other specific nitrogenous compounds which I have found to be highly useful for the specific purposes of the present invention may be selected from a large group including those of aliphatic, aromatic, or heterocylic character, representative examples of which are carbodiimid, its polymerization product which is also known as cyanoguanidine or param, succinimide, phthalimide, maleinimide, imidazol or glyoxalin, cyclic amide of ortho sulpho-benzoic acid, creatinine, pyrazol; the amidines and imidines, which may be considered as species of the imides, including, by way of example, acetamidine, cyanamidine, diamidine, succinamidine, and succinimidine. The condensation products of primary and secondary hydroxy-alkylamines with high molecular weight aliphatic and fatty acids, which aliphatic or fatty acids contain at least eight and preferably from twelve to eighteen carbon atoms, are also quite useful. Such condensation products may be prepared, for example, by condensing one mol of monoethanolamine or diethanolamine with at least one and preferably from one and one-half to two mols of higher molecular weight fatty acids at temperatures ranging from about 135 degrees C. to about 180 degrees C. for two to four hours. A particularly satisfactory product of this sub-class is one produced from one mol of stearic or oleic acid and one and one-half to two mols of diethanolamine. Other imides include those in the homologous series corresponding to succinimide which may be derived from or considered as derivatives of glutaric acid, suberic acid, adipic acid, sebacic acid, malonic acid, azelaic acid, and the like. Among the nitriles or cyano compounds, which are characterized by the presence of the nucleus —C≡N in an aliphatic chain, in a heterocyclic ring, or attached to an aromatic ring, may be mentioned aceto-nitrile, propiono-nitrile, succino-nitrile, cyan imino hydrindea, imino cyan-cyclopentanone, and other nitriles corresponding to the homologous series of mono-carboxylic or fatty acids and polycarboxylic acids such as valero-nitrile, adipo-nitrile, and the like. It will be understood that mixtures of any two or more of the hereinabove described addition agents may be employed in a single astringent preparation. In certain cases, improved results are obtained by using mixtures of two or more of the addition agents.

The compounds employed in accordance with the present invention possess the important advantage over various other compounds or classes of compounds which have been heretofore suggested in that they provide exceptional protection to fabrics where the molal ratio of the added agent to the astringent material, such as aluminum chloride, is as low as one to one. While the employment of one and one-half mols or two mols of the added agent to one mol of the astringent material provides slightly greater protection, it is in no wise proportionate to the increased amount of the added agent. Furthermore, in connection with the preparation of the astringent material in the form of a liquid or a lotion, the added agents are especially satisfactory in that the reaction product apparently formed between the astringent material and the added agent is not deliquescent but is quite dry. This results in decreasing the drying time without impairment of the efficiency of the product.

Of the numerous compounds or addition agents which have been disclosed hereinabove, param, succino-nitrile, pyrazol, and imidazole have been found to be unusually efficacious. Succinimide is also very satisfactory.

In order that those skilled in the art may even more fully understand the manner in which my invention may be practiced, I set out hereinbelow various specific embodiments. It will be understood that these are mentioned only as illustrative and are not to be construed as limitative of my invention in any manner. Thus, for example, the proportions of ingredients may be varied, different combinations of ingredients may be employed, and other changes may be made without departing from the principles of my invention as set out hereinabove and in the appended claims. In the following examples, all parts are by weight:

*Example 1*

| | Parts |
|---|---|
| Aluminum chloride (one mol) | 18 |
| Carbodiimid (one mol) | 18 |
| Water | 18 |
| Witch-hazel | 46 |

*Example 2*

| | Parts |
|---|---|
| Aluminum chloride (one mol) | 18 |
| Param (one mol) | 9 |
| Water | 73 |

*Example 3*

| | Parts |
|---|---|
| "Tegacid" | 18 |
| Spermaceti wax | 2 |
| Aluminum chloride | 18 |
| Succinimide | 9 |
| Water | 53 |

*Example 4*

| | Parts |
|---|---|
| Beeswax | 15 |
| Paraffin | 20 |
| Spermaceti wax | 20 |
| Ozokerite | 10 |
| Vaseline | 50 |
| Lanolin | 10 |
| Titanium dioxide | 10 |
| Anhydrous aluminum chloride | 14 |
| Pyrazol | 6.8 |

*Example 5*

| | Parts |
|---|---|
| Condensation product of one mol of stearic acid and two mols of diethanolamine | 10 |
| Bleached montan wax | 10 |
| Aluminum chloride | 10 |
| Water | 45 |

In the case of Examples 1, 2 and 5, the dry ingredients are mixed, a little of the water is added to form a paste, and then the balance of the water or witch-hazel is added.

In the case of Example 3, the fatty materials are melted together at a temperature of approximately 70 degrees C. and a primary emulsion is made with the succinimide dissolved in water, said solution being previously heated to 70 degrees C. When the emulsion has cooled to 45 degrees C., the dry aluminum chloride is added slowly to the cream and mixed therewith until it is thoroughly dispersed therein.

In the case of Example 4, which product is used in the form of a pencil, the aluminum chloride and pyrazol are first ground together and then incorporated in the mixture of the fatty materials. Alternatively, the pyrazol may be dissolved in the fatty materials and the resulting product then mixed with the dry aluminum chloride.

The addition agents which I employ herein are preferably water-soluble, particularly in case the astringent preparation comprises an aqueous solution or a lotion. Where, however, the astringent preparation comprises a cosmetic cream or the like, it is unnecessary that the addition agent be freely water-soluble. In such case, it is effective if it is dispersible or suspensible in aqueous media as, for example, in the case of the condensation products of the higher fatty acids and diethanolamine. In case the astringent preparation takes the form of a stick or astringent, it is best to select an addition agent which is somewhat soluble in fats as, for example, pyrazol. I employ the term "soluble" herein, therefore, to mean both true or molecular solubility as well as dispersibility.

The proportions of the ingredients are subject to relatively wide variation. In general, however, I prefer to employ, based on the weight of the finished astringent preparation, from about 6% to about 25% of aluminum chloride or similar astringent material and from about 3% to about 15% of the various addition agents, said percentages being by weight. The amount of addition agent should be sufficient to counteract the effect of the excessive acidity due to the astringent material. Those skilled in the art will, in the light of my teachings herein, be able to select proportions of ingredients to suit their particular purposes.

When the astringent preparation is prepared in the form of a liquid cream or solid cream, I prefer to use an acid emulsifying agent. The product known as "Tegacid," which is apparently a reaction product of monostearin with a phosphoric acid derivative of oleic acid amide of diethyl ethylene diamine, is very suitable. Other products which may be effectively used for this purpose are the product known in the trade as "Aquarol" and various of the compounds disclosed, for example, in United States Patent No. 2,089,212.

I may also utilize the astringent preparations in the form of pads. Thus, for example, cotton cloth may be impregnated, for instance, by immersing the same in the solution of Example 1 hereinabove and then dried. In use, the skin is rubbed with the impregnated pads.

It will be understood that the invention may take various forms and the novel principles thereof are not to be limited other than by the scope of the claims.

The present application is a division of application Serial No. 309,830, filed December 18, 1939.

What I claim as new and desire to protect by Letters Patent of the United States is:

1. A cosmetic astringent preparation including an astringent material and a soluble nitrile.

2. A cosmetic astringent preparation including an astringent material in the form of an aluminum salt and a soluble heterocyclic nitrile.

3. A cosmetic astringent preparation including aluminum chloride and succino-nitrile.

4. A cosmetic astringent preparation including aqueous material, aluminum chloride, and succino-nitrile, the molal ratio of the succino-nitrile to the aluminum chloride being not substantially less than one to one.

5. A cosmetic astringent preparation containing water, an aluminum salt as an astringent material, and the polymerization product of carbodiimid.

6. A cosmetic astringent preparation including aqueous material, aluminum chloride, and the polymerization product of carbodiimid.

7. A cosmetic astringent preparation containing, by weight, from about 6% to about 25% of aluminum chloride and from about 3% to about 15% of the polymerization product of carbodiimid.

8. A cosmetic astringent preparation including aluminum sulphate and a soluble nitrile.

9. A cosmetic astringent preparation including aluminum sulphate and succino-nitrile.

10. A cosmetic astringent cream comprising an emulsion of oleaginous and aqueous materials, a soluble nitrile, and an astringent material comprising a salt of aluminum with a strong inorganic acid.

11. A cosmetic astringent preparation including an astringent material in the form of a metal salt which hydrolyzes to produce an acidic material, said preparation containing a proportion of a soluble nitrile.

JULES B. MONTENIER.